US009157038B2

(12) United States Patent
Banerjee et al.

(10) Patent No.: US 9,157,038 B2
(45) Date of Patent: Oct. 13, 2015

(54) PROCESS FOR WASHING A GAS FROM A HYDROPROCESSED EFFLUENT, AND AN APPARATUS AND SEPARATOR RELATING THERETO

(71) Applicant: UOP, LLC, Des Plaines, IL (US)

(72) Inventors: Soumendra Mohan Banerjee, New Delhi (IN); Richard Hoehn, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 275 days.

(21) Appl. No.: 13/629,868

(22) Filed: Sep. 28, 2012

(65) Prior Publication Data

US 2014/0091009 A1     Apr. 3, 2014

(51) Int. Cl.
| | |
|---|---|
| *C10G 31/08* | (2006.01) |
| *C10G 70/06* | (2006.01) |
| *C10K 1/00* | (2006.01) |
| *C10K 1/10* | (2006.01) |
| *B01D 19/00* | (2006.01) |
| *B01D 53/18* | (2006.01) |
| *B01D 53/14* | (2006.01) |

(52) U.S. Cl.
CPC ............ *C10G 70/06* (2013.01); *B01D 19/0042* (2013.01); *B01D 53/1468* (2013.01); *B01D 53/18* (2013.01); *C10K 1/004* (2013.01); *C10K 1/101* (2013.01); *B01D 53/1425* (2013.01); *B01D 2257/406* (2013.01)

(58) Field of Classification Search
CPC .......... B01D 5/00; B01D 5/0027; B01D 5/03; B01D 5/0084; B01D 5/0087; B01D 5/009; B01D 3/26; B01D 53/1425; B01D 53/1468; B01D 53/18; B01D 19/0042; B01D 2257/406; C10G 70/06; C10K 1/004; C10K 1/101
USPC .......... 208/208 R, 245 R, 100, 103; 422/187; 96/155
See application file for complete search history.

(56) References Cited

U.S. PATENT DOCUMENTS

| | | | |
|---|---|---|---|
| 3,206,389 A | * | 9/1965 | Gast et al. ...................... 208/58 |
| 3,719,740 A | | 3/1973 | Larimore et al. |
| 4,088,735 A | | 5/1978 | Bratzler et al. |
| 4,447,315 A | | 5/1984 | Lamb et al. |

(Continued)

FOREIGN PATENT DOCUMENTS

GB          1191958         5/1970

OTHER PUBLICATIONS

U.S. Appl. No. 13/076,670, filed Mar. 31, 2011, Wieber.

(Continued)

*Primary Examiner* — Prem C Singh
*Assistant Examiner* — Brandi M Doyle
(74) *Attorney, Agent, or Firm* — James C. Paschall

(57) ABSTRACT

One exemplary embodiment can be a process for washing a gas from a hydroprocessed effluent from a hydroprocessing zone. The process may include adding a first portion of a wash water stream to the hydroprocessed effluent to form a combined stream, condensing the combined stream, adding a first portion of a wash water stream to the effluent to form a combined stream, sending the combined stream to a separator, and providing a second portion of the wash water stream to the tower for washing one or more gases rising in the tower. The separator can include a substantially cylindrical body, in turn, coupled to a boot and a tower.

15 Claims, 1 Drawing Sheet

(56) References Cited

U.S. PATENT DOCUMENTS

| | | |
|---|---|---|
| 4,559,210 A | 12/1985 | Diemer et al. |
| 4,892,643 A | 1/1990 | Herbst et al. |
| 5,387,407 A | 2/1995 | Ruegg et al. |
| 5,858,206 A * | 1/1999 | Castillo .................. 208/101 |
| 6,361,683 B1 | 3/2002 | Kalnes |
| 6,402,935 B1 | 6/2002 | Kalnes |
| 8,028,975 B2 | 10/2011 | Tertel et al. |
| 8,133,446 B2 | 3/2012 | McGehee et al. |
| 2006/0165575 A1 * | 7/2006 | Bassi et al. .............. 423/243.01 |
| 2009/0101546 A1 * | 4/2009 | Sideropoulos et al. ....... 208/366 |
| 2010/0122936 A1 | 5/2010 | Tertel et al. |
| 2010/0200458 A1 | 8/2010 | Kalnes |

OTHER PUBLICATIONS

Palmer et al., "Clean Diesel Hydrotreating", PTQ, vol. Q1, 2009, pp. 91-92, 94, 96, 98-100.

"Chevron WWT Two-Stage Sour Water Stripping", Chevron Research Company brochure, 1998, p. 16 pages.

Search Report dated Dec. 19, 2013 for corresponding PCT Appl. No. PCT/US2013/058117.

* cited by examiner

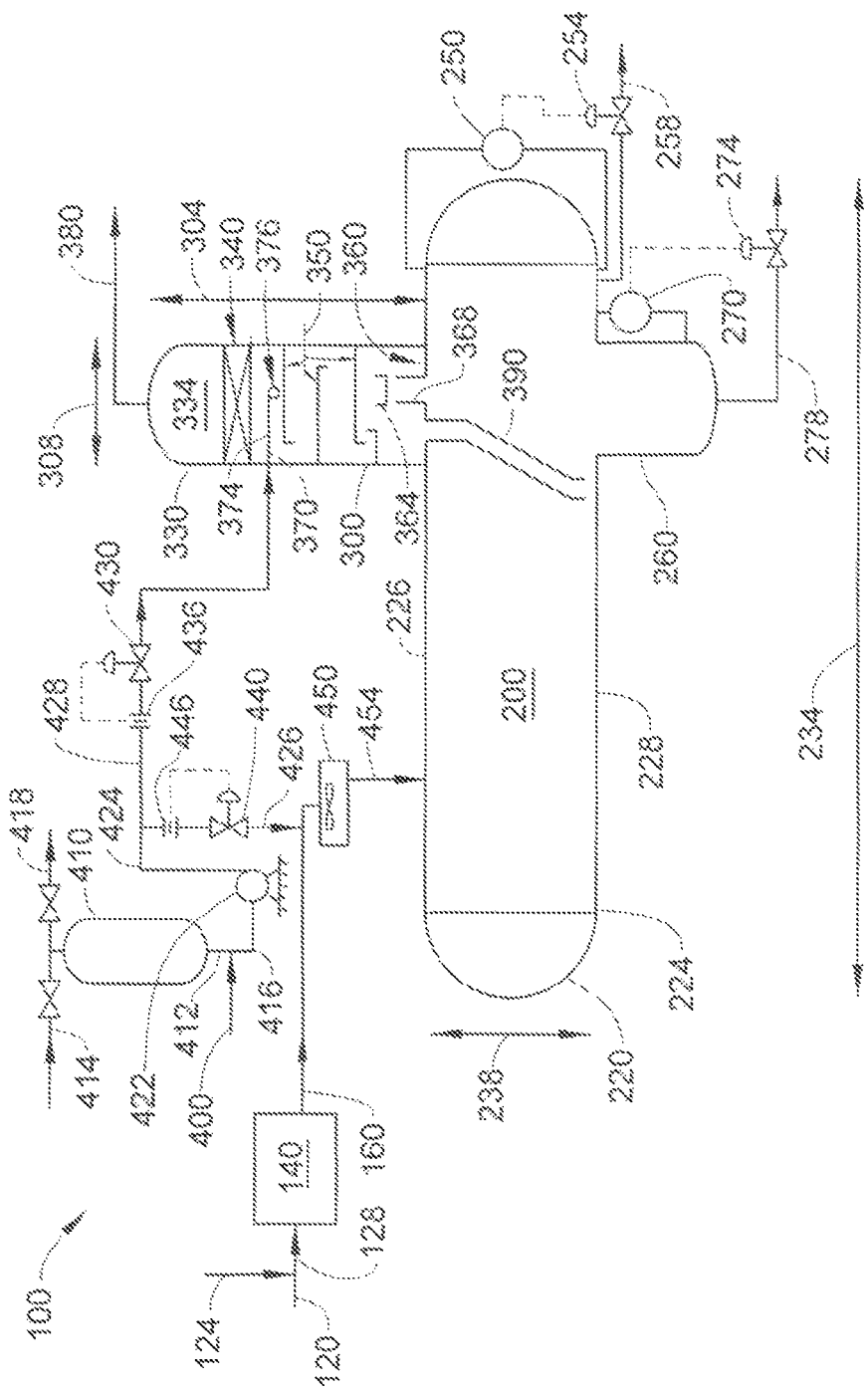

PROCESS FOR WASHING A GAS FROM A HYDROPROCESSED EFFLUENT, AND AN APPARATUS AND SEPARATOR RELATING THERETO

FIELD OF THE INVENTION

This invention generally relates to a process for washing a gas from a hydroprocessed effluent, and an apparatus and a separator relating thereto.

DESCRIPTION OF THE RELATED ART

Generally, there is an increasing trend among refiners to process heavier crudes that contain high amounts of sulfur and nitrogen compounds. The vacuum gas oil obtained from such crudes can, in turn, also contain large amounts of sulfur and nitrogen compounds. During hydroprocessing of such vacuum gas oil feeds, the sulfur and nitrogen compounds may be converted to hydrogen sulfide and ammonia formed by the reaction of the sulfur and nitrogen compounds with hydrogen. The resulting reactor effluent can contain a high amount of hydrogen sulfide and ammonia. In sufficient concentrations, the ammonia and hydrogen sulfide can combine to form ammonium bisulfide, which usually deposits in the reactor effluent condenser and can result in plugging of this exchanger.

Water may be added to prevent plugging of the exchanger by hindering dissolving the ammonium bisulfide salts. Typically, not all of the ammonia combines with hydrogen sulfide in the reactor effluent material and, thus, not all of the ammonia is removed.

Hence, some ammonia can pass through the separator and into the recycle gas. Typically, the recycle gas is contacted with an amine solution in the downstream recycle gas scrubber. The ammonia absorbed by the amine, and along with the absorbed hydrogen sulfide, may be sent to an amine regenerator. Heavy corrosion of the amine regenerator overhead system can occur due to ammonium bisulfide salts that may deposit in the amine regenerator overhead condenser, particularly if the temperature is low enough for the salt to precipitate.

SUMMARY OF THE INVENTION

One exemplary embodiment can be a process for washing a gas from a hydroprocessed effluent from a hydroprocessing zone. The process may include adding a first portion of a wash water stream to the hydroprocessed effluent to form a combined stream, condensing the combined stream, adding a first portion of a wash water stream to the effluent to form a combined stream, sending the combined stream to a separator, and providing a second portion of the wash water stream to the tower for washing one or more gases rising in the tower. The separator can include a substantially cylindrical body, in turn, coupled to a boot and a tower.

Another exemplary embodiment may be an apparatus. The apparatus can include a hydroprocessing zone, and a separator. Often, the separator includes a substantially cylindrical body, in turn, coupled to a tower. Generally, the tower has one or more walls surrounding a void, one or more trays positioned within the void, and a distributor positioned above the one or more trays. Usually, the tower has a height greater than its width, the substantially cylindrical body has a length greater than its height, and the height of the tower is orientated substantially perpendicular to the length of the substantially cylindrical body.

A further exemplary embodiment can be a separator for a hydroprocessed effluent. Often, the separator includes a substantially cylindrical body, a tower coupled to a top side of the substantially cylindrical body, and a boot coupled to a bottom side of the substantially cylindrical body.

The embodiments disclosed herein can employ two stages of wash water that may effectively limit the amount of the ammonia in the recycle gas exiting the separator, typically a cold separator. In one exemplary embodiment, an additional column is provided on the top of the separator. The normal wash water may be provided at the inlet of the reactor effluent condenser and the mixture may then enter the separator. Before the recycle gas can exit the separator, the recycle gas can be routed through this trayed section and be washed by fresh wash water to remove ammonia. Generally, the fresh wash water is fed to this section above the trays, and below the mesh blanket located above the trays.

The counter-current contact of the recycle gas with the wash water in the trayed section can ensure an effective wash of the ammonia from the recycle gas and greatly reduce the carryover of ammonia in the downstream recycle gas scrubber or the recycle gas cooler, if present. The water may be collected in a chimney tray that can have a downcomer to route the water to the separator boot. From the boot, the total sour water may be drained to a flash drum and then to a sour water stripper. The current embodiments disclosed herein can offer a much higher level of ammonia removal from the recycle gas to levels that may reduce or prevent corrosion of downstream equipment or contamination of the rich amine

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. Additionally, a stream may include other fluids, such as water, in addition to or instead of one or more hydrocarbons.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 20%, and preferably about 40%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "naphtha" can include one or more C5-C10 hydrocarbons and have a boiling point of about 25-about 190° C. at atmospheric pressure. The term "light naphtha" can include one or more C5-C6 hydrocarbons and have a boiling point of about 25-about 90° C.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As used herein, the terms "absorbent" and "absorber" include, respectively, an adsorbent and an adsorber, and relates, but is not limited to, absorption, and/or adsorption.

As used herein, the term "vapor" can mean a gas or a dispersion that may include or consist of one or more hydrocarbons.

As used herein, the term "vaporization" can mean using at least one of heat and pressure to change at least a portion of a liquid to a gas optionally forming a dispersion, such as a gas entraining at least one of liquid and solid particles.

As used herein, the term "overhead stream" can mean a stream withdrawn at or near a top of a vessel, such as a separator.

As used herein, the term "bottom stream" can mean a stream withdrawn at or near a bottom of a vessel, such as a separator.

As depicted, process flow lines in the figures can be referred to interchangeably as, e.g., lines, pipes, feeds, gases, products, discharges, parts, portions, or streams.

BRIEF DESCRIPTION OF THE DRAWING

The FIGURE depicts an exemplary apparatus.

DETAILED DESCRIPTION

Referring to the FIGURE, an apparatus 100 can include hydroprocessing zone 140, a separator 200, and a storage drum 410. The hydroprocessing zone 140 can receive a feed 120. Generally, the feed can be any suitable heavy oil feed stock. Such heavy oil feedstocks can include hydrocarbonaceous streams having components boiling above about 200° C., such as atmospheric gas oils, vacuum gas oil, deasphalted, vacuum, and atmospheric residua, coker distillates, straight run distillates, solvent-deasphalted oils, pyrolysis-derived oils, high boiling synthetic oils, cycle oils, hydrocracked feeds, and cat cracker distillates. These hydrocarbonaceous feed stocks may contain from about 0.1-about 4%, by weight, sulfur. Other suitable heavy oil feedstocks are disclosed in, e.g., U.S. Pat. No. 3,719,740.

The feed 120 can be combined with a hydrogen gas 124. The hydrogen gas can include a recycled hydrogen gas as well as make-up hydrogen. Thus, other gases, such as methane, may be also present in smaller quantities, in addition to the hydrogen. The hydrogen gas rate can be about 80-about 1,700 normalized meter-cubed of hydrogen per meter-cubed of hydrogen feed.

The hydroprocessing zone 140 can include any suitable hydroprocessing reactor for conducting activity such as demetallizing, desulfurizing, denitrogenating, hydroisomerization, hydrotreating, and hydrocracking. More than one hydroprocessing reactor may be utilized. The hydroprocessing reactor can include at least one Group VIII metal, preferably iron, cobalt and nickel, on a high surface area support material, preferably alumina Other suitable hydrotreating catalysts include zeolitic catalysts, as well as noble metal catalysts where the noble metal can be at least one of palladium and platinum. The Group VIII metal is typically present in an amount of about 2-about 20%, by weight, preferably about 4-about 12%, by weight, based on the weight of the catalyst. The Group VI metal can be present in an amount of about 1-about 25%, by weight, preferably about 2-about 25%, by weight, based on the weight of the catalyst. Other catalysts and/or methods of manufacture are disclosed in, e.g., U.S. application Ser. No. 13/076,670 filed 31 Mar. 2011 and U.S. Pat. No. 3,719,740.

The hydroprocessing conditions can include a temperature of about 290-about 460° C., a pressure of about 3-about 20 MPa, and a liquid hourly space velocity of the fresh hydrocarbonaceous feed of about 0.1-about 4 $hr^{-1}$. A hydroprocessed effluent 160 obtained from the hydroprocessing zone 140 may include one or more hydrocarbons, such as one or more C1-C30, and can be provided to the separator 200.

The separator 200 may be a cold separator usually operating at a temperature of less than about 150° C., such as about 50-65° C., and can include a substantially cylindrical body 220, a boot 260 and a tower 300. Generally, the boot 260 and tower 300 are coupled on opposing sides 226 and 228 of the substantially cylindrical body 220. Generally, the substantially cylindrical body 220 has a base 224, the top side 226, and the bottom side 228. Generally, the substantially cylindrical body 220 has a length 234 greater than a height 238. Moreover, a first level controller 250 may be coupled to an end of the substantially cylindrical body 220.

The boot 260 has a substantially cylindrical shape and is coupled to the bottom side 228 of the substantially cylindrical body 220. Typically, the boot 260 can receive water which can be withdrawn as a water stream 278, which is usually sour. Generally, a second level controller 270 is coupled to the boot 260 for measuring the water level and communicates with a control valve 274 to regulate that level.

The tower 300 can be orientated substantially perpendicular to the substantially cylindrical body 220 and form a substantially cylindrical shape. Generally, the tower 300 has a height 304 greater than a width 308 and has one or more walls 330 surrounding a void 334. Generally, the tower 300 contains a demister 340, and one or more trays 350 positioned within the void 334 with at least one of the trays being at least one chimney tray 360. The demister 340 can be any suitable device, such as a mesh blanket or one or more vanes. Generally, the one or more trays 350 can be offset within the tower 300. The at least one chimney tray 360 can form a chimney 368 with a cap 364 positioned above.

Generally, the at least one chimney tray 360 can form a partition between the tower 300 and the substantially cylindrical body 220. A conduit 390 can communicate water from the tower 300 to the base 224 of the substantially cylindrical body 220 to place the water proximate to the boot 260. In an aspect, an outlet of the conduit 390 may be horizontally offset from the boot 260. Moreover, a distributor 370 can be positioned within the tower 300 underneath the demister 340 and above the one or more trays 350. The distributor 370 can include a pipe 374 forming one or more nozzles 376. Alternatively, the one or more nozzles 376 can be replaced with one or more holes.

The storage drum 410 can hold excess water from a wash water stream 400. Generally, a nitrogen blanket can be provided by communicating a nitrogen stream 414 with the storage drum 410. A relief manifold 418 may relieve excess gases to lower pressure. The wash water stream 400 can be provided downstream of the storage drum 410 and optionally be combined with a bottom stream 412 to form a combined stream 416 received by the suction side of a pump 422. The pump 422 can provide a discharge stream 424 that can be split into a first portion 426 and a second portion 428. The first portion 426 can pass through an orifice plate 446 and be regulated by a control valve 440. The first portion 426 can be combined with the hydroprocessed effluent 160. The second portion 428 can pass through an orifice plate 436 and be regulated by a control valve 430. The second portion 428 can be provided to the tower 300 of the separator 200.

In operation, the feed 120 can be combined with the hydrogen gas 124 to form a combined feed 128 to the hydroprocessing zone 140. The hydroprocessing zone 140 can, in turn, provide a hydroprocessed effluent 160. Generally, the hydroprocessed effluent 160 is combined with the first portion 426 of the discharge stream 424. Often, a combined stream 454 is passed through a cooler 450 and condensed before entering the separator 200. In the separator 200, the hydrocarbon liquid, vapor, and water can separate.

Water can travel to the boot 260 and the level controlled by the second level controller 270 communicating with the control valve 274 to withdraw a sour water stream 278. The hydrocarbon can be withdrawn utilizing a first level controller 250 having a first control valve 254 to regulate a hydrocarbon stream 258. Gases that emanate from the hydrocarbon within the substantially cylindrical body 220 can rise through the chimney 368 and up through the tower 300.

The second portion 428 of the discharge stream 424 can be provided to the tower 300 via the distributor 370. Wash water can exit one or more nozzles 376 to spray the gases rising within the tower 300. Generally, the gases within the void 334 are washed with the water falling downward to the base of the tower 300. The gases may continue to rise upward through the tower 300 with water washing the rising gases to remove ammonia and hydrogen sulfide. Subsequently, the gases can pass through the demister 340 removing any entrained droplets and finally exit as a recycled gas stream 380, which may include hydrogen and be subsequently contacted with an amine solution to remove hydrogen sulfide for subsequent recycling. The two stages of water wash contacting are typically sufficient to remove ammonia from the recycled gas stream 380 to a level that can prevent corrosion in an amine regeneration unit.

The conduit 390 can communicate the water from the tower 300 to the base 224 of the substantially cylindrical body 220 to place the water proximate to the boot 260. Thus, the water can exit the boot 260, as described above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for washing a gas from a hydroprocessed effluent from a hydroprocessing zone, comprising:
   A) adding a first portion of a wash water stream to the hydroprocessed effluent to form a combined stream;
   B) condensing the combined stream;
   C) sending the combined stream to a separator; wherein the separator comprises a substantially cylindrical body, in turn coupled to a boot and a tower;
   D) providing a second portion of the wash water stream to the tower for washing ammonia and hydrogen sulfide rising in the tower.

2. The process according to claim 1, further comprising withdrawing a water stream from the boot of the separator.

3. The process according to claim 1, wherein the tower comprises one or more walls surrounding a void, a demister positioned within the void, and a distributor positioned below the demister; wherein the tower has a height greater than its width, the substantially cylindrical body has a length greater than its height, and the height of the tower is orientated substantially perpendicular to a length of the substantially cylindrical body.

4. The process according to claim 3, wherein the tower further comprises one or more trays positioned beneath the distributor.

5. The process according to claim 3, wherein the one or more walls of the tower form a substantially cylindrical shape.

6. The process according to claim 4, wherein the one or more trays comprises at least one chimney tray.

7. The process according to claim 1, further comprising a conduit communicating water from the tower to a base of the separator.

8. The process according to claim 1, further passing a recycle gas stream from the tower wherein the recycle gas stream comprises hydrogen.

9. The process according to claim 3, wherein the distributor comprises an elongated pipe forming one or more nozzles.

10. The process according to claim 1, wherein the hydroprocessed effluent comprises one or more C1-C30 hydrocarbons.

11. A process for washing a gas from a hydroprocessed effluent from a hydroprocessing zone, comprising:
    A) adding a first portion of a wash water stream to the hydroprocessed effluent to form a combined stream;
    B) condensing the combined stream;
    C) sending the combined stream to a separator; wherein the separator comprises a substantially cylindrical body, in turn coupled to a boot and a tower;
    D) providing a second portion of the wash water stream to the tower for washing one or more gases rising in the tower;
    E) contacting a recycle gas stream including hydrogen and water from the tower with a solution to remove hydrogen sulfide and ammonia.

12. The process according to claim 11, further comprising withdrawing a water stream from the boot of the separator.

13. The process according to claim 11, wherein the tower comprises one or more walls surrounding a void, a demister positioned within the void, and a distributor positioned below the demister; wherein the tower has a height greater than its width, the substantially cylindrical body has a length greater than its height, and the height of the tower is orientated substantially perpendicular to a length of the substantially cylindrical body.

14. The process according to claim 13, wherein the tower further comprises one or more trays positioned beneath the distributor.

15. The process according to claim 11, further comprising a conduit communicating water from the tower to a base of the separator.

* * * * *